Dec. 27, 1966   F. S. C. BRANCO   3,295,032
PLURAL MOTOR TENSION AND SPEED CONTROL FOR A MAGNETIC TAPE DRIVE
Filed May 24, 1963   7 Sheets-Sheet 1
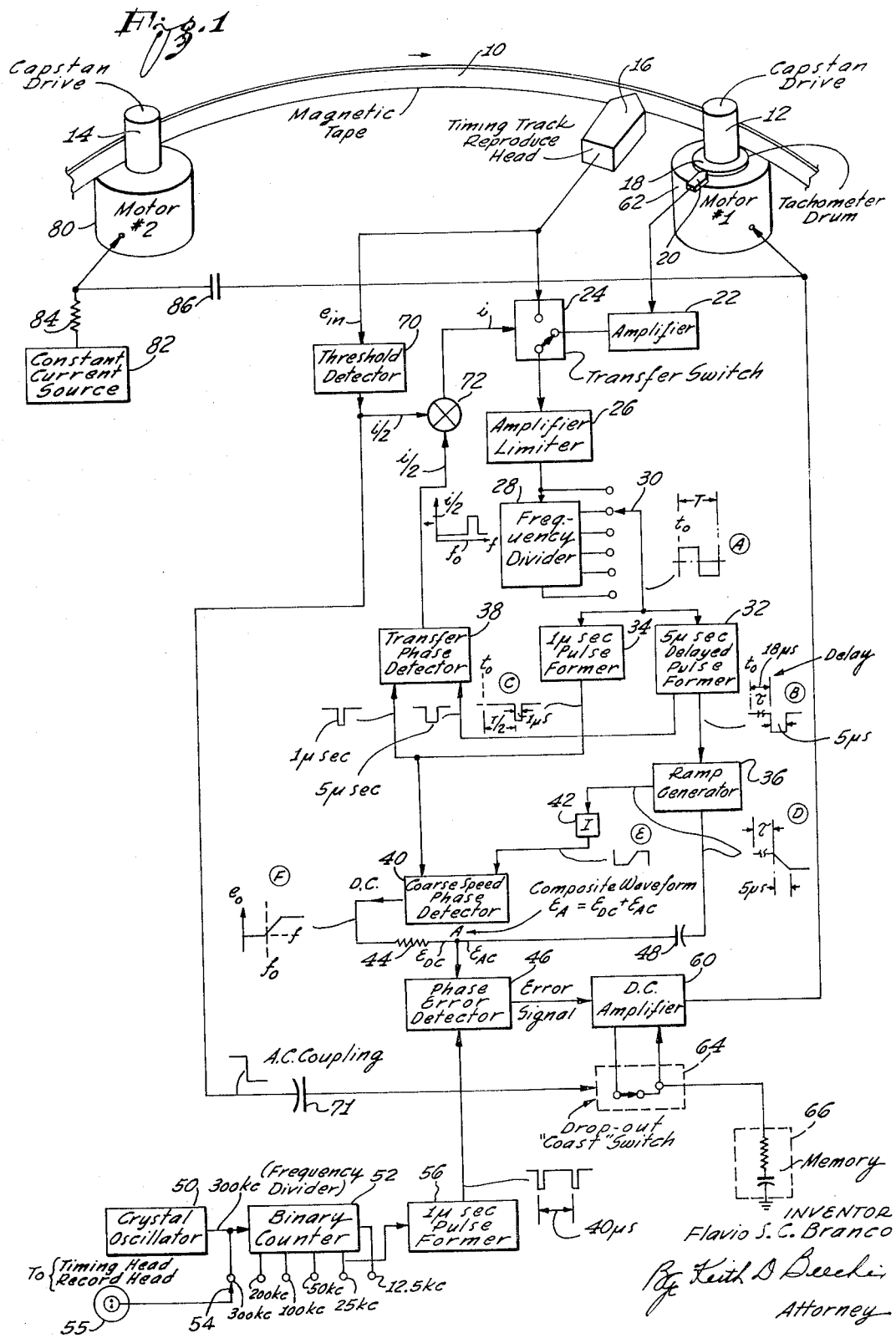
INVENTOR
Flavio S. C. Branco
By Keith D. Beecher
Attorney

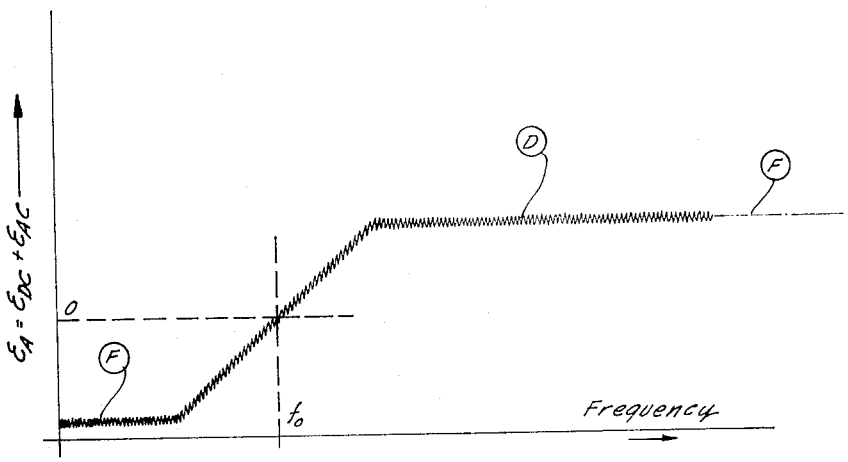
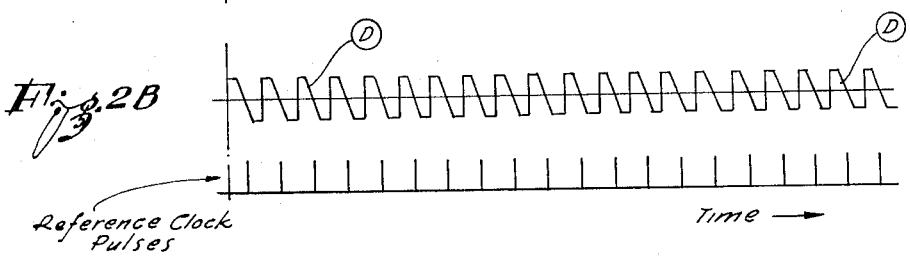
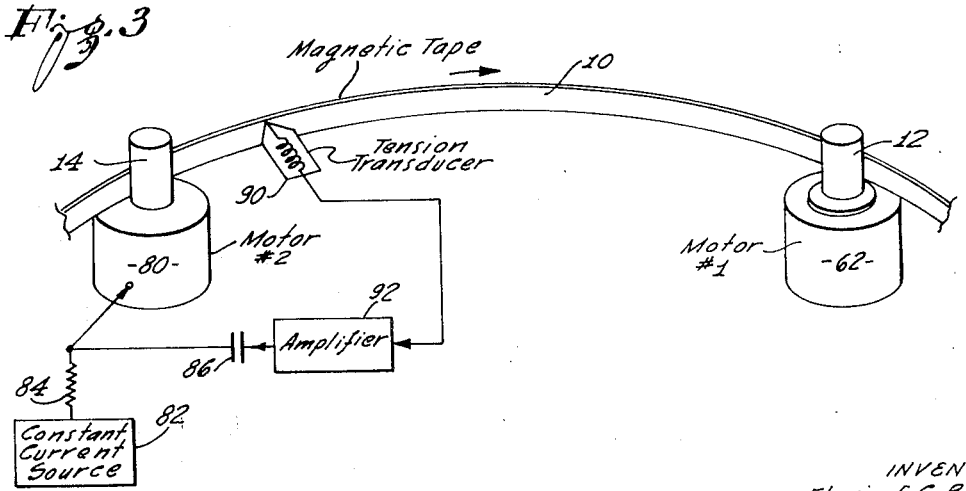

Dec. 27, 1966  F. S. C. BRANCO  3,295,032
PLURAL MOTOR TENSION AND SPEED CONTROL FOR A MAGNETIC TAPE DRIVE
Filed May 24, 1963  7 Sheets-Sheet 3
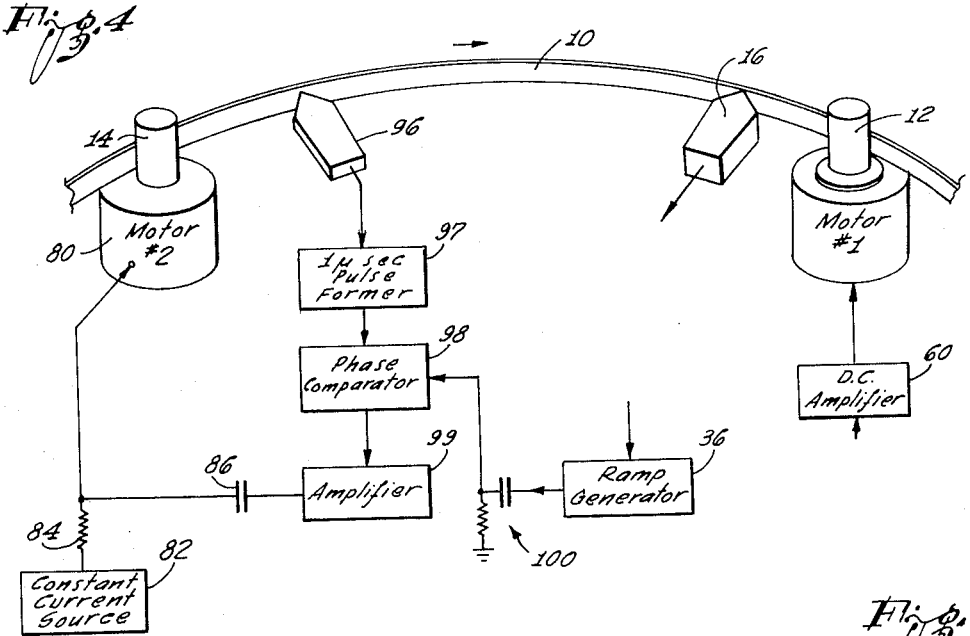
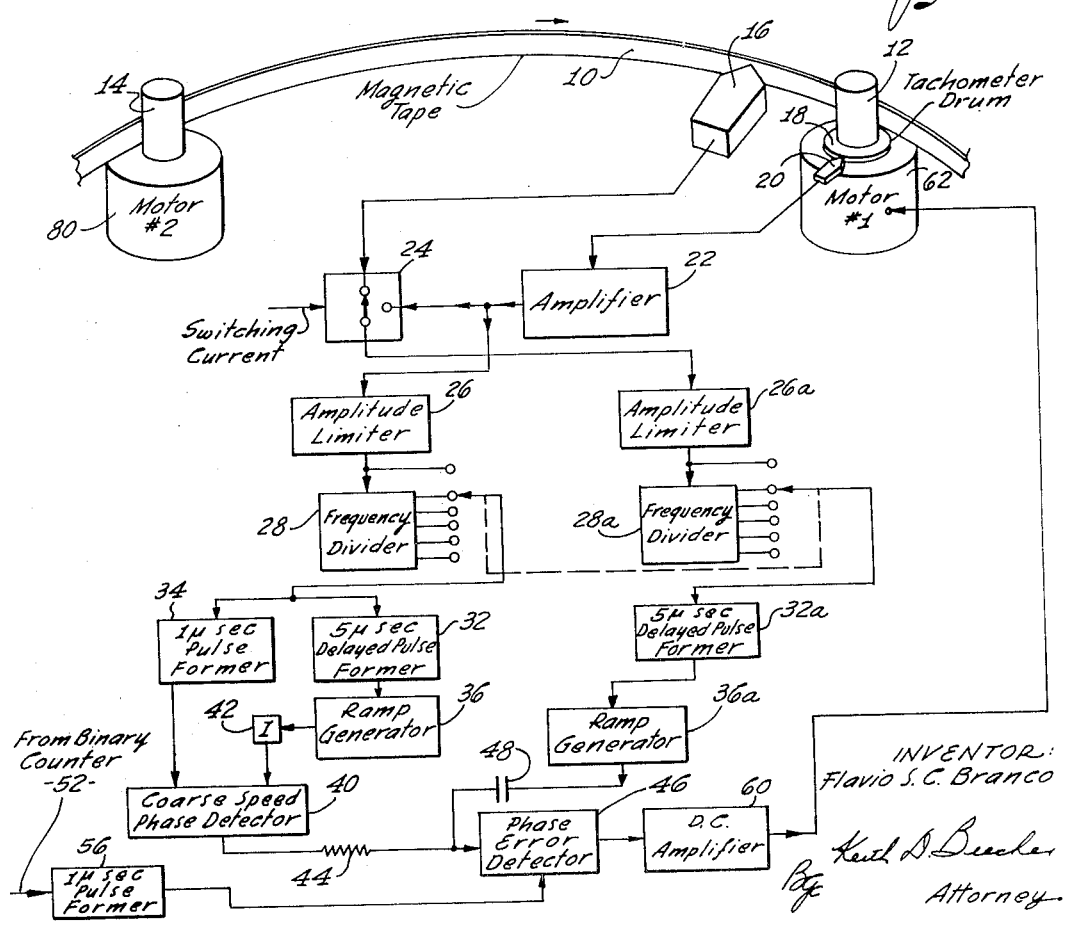

Dec. 27, 1966  F. S. C. BRANCO  3,295,032
PLURAL MOTOR TENSION AND SPEED CONTROL FOR A MAGNETIC TAPE DRIVE
Filed May 24, 1963  7 Sheets-Sheet 4

INVENTOR:
Flavio S.C. Branco

By Keith D. Beecher
Attorney

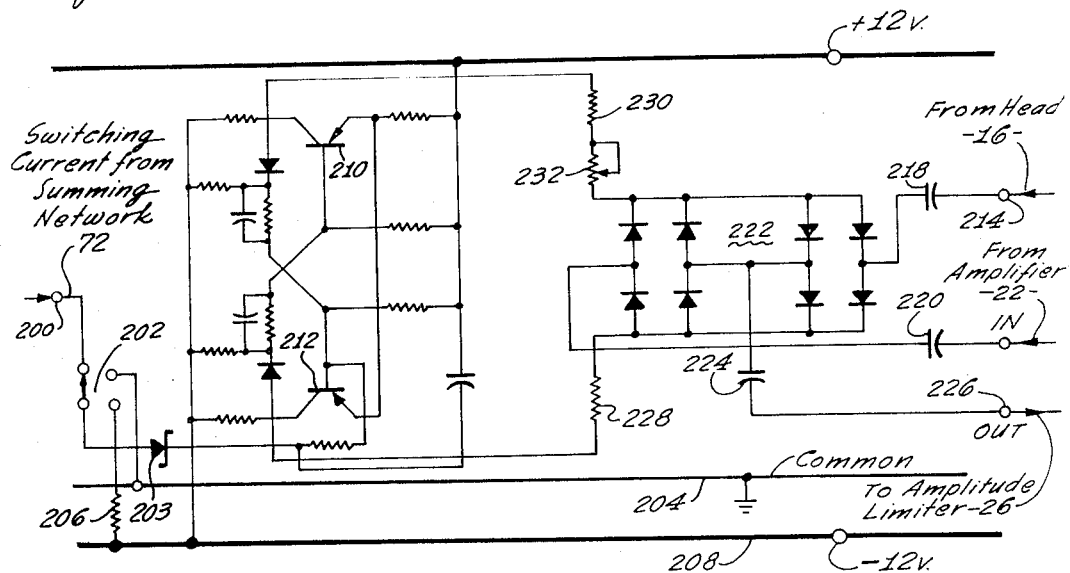
Fig. 8 (Transfer Switch-24)
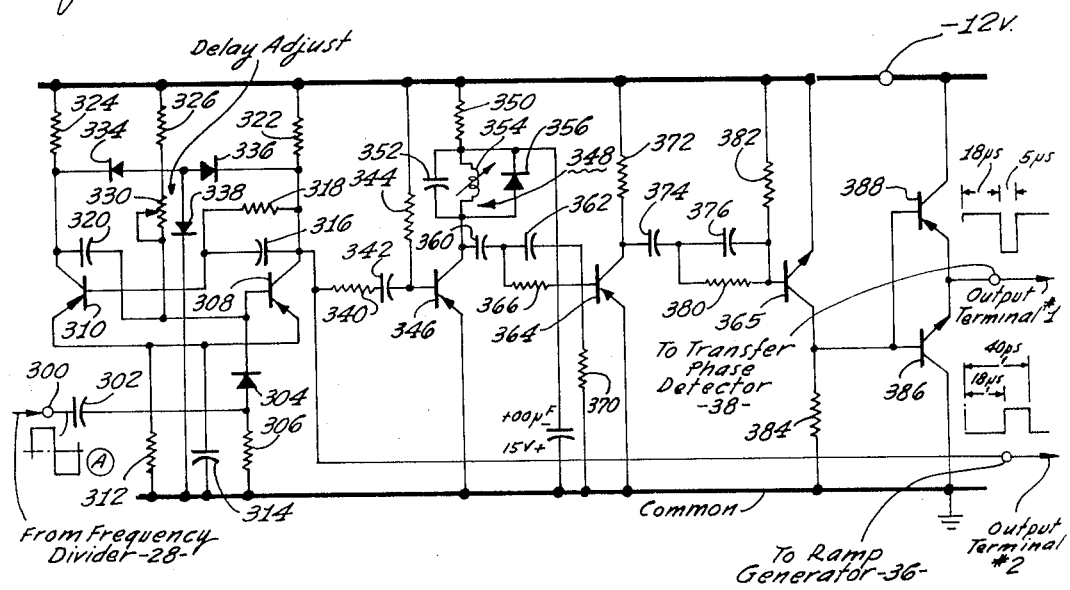
Fig. 9 (Delayed Pulse Former -32-)

Dec. 27, 1966 F. S. C. BRANCO 3,295,032
PLURAL MOTOR TENSION AND SPEED CONTROL FOR A MAGNETIC TAPE DRIVE
Filed May 24, 1963 7 Sheets-Sheet 6
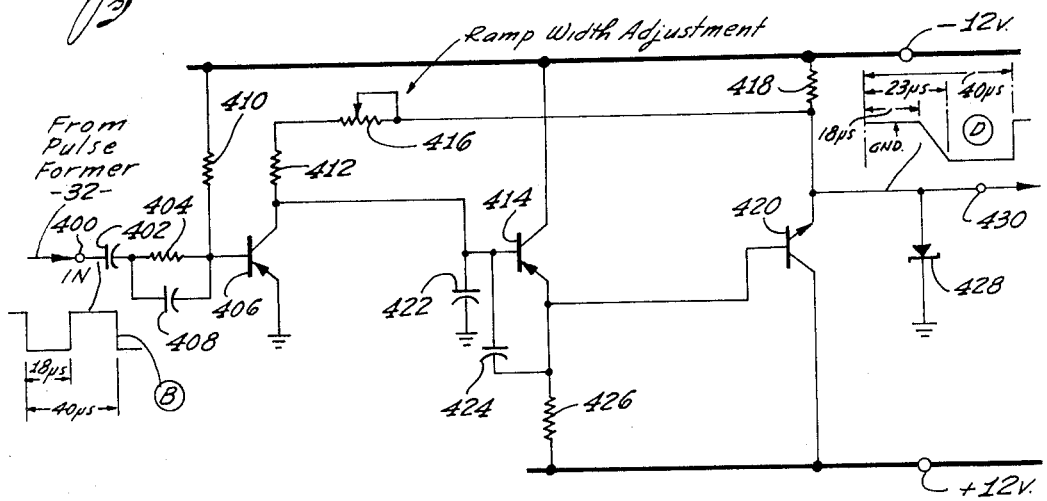
Fig. 10 (Ramp Generator-36)
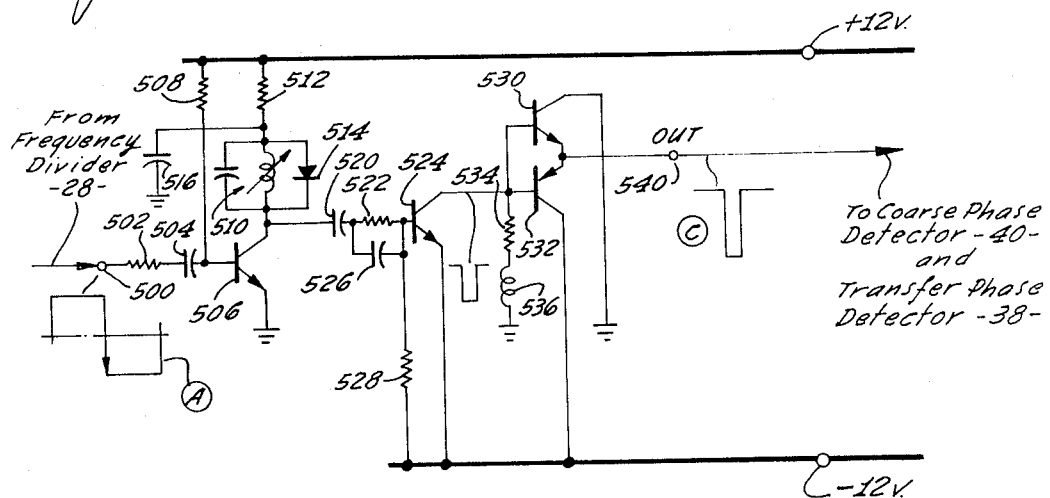
Fig. 11 (1μs Pulse Former-34-)
INVENTOR:
Flavio S. C. Branco
By Keith D. Beecher
Attorney

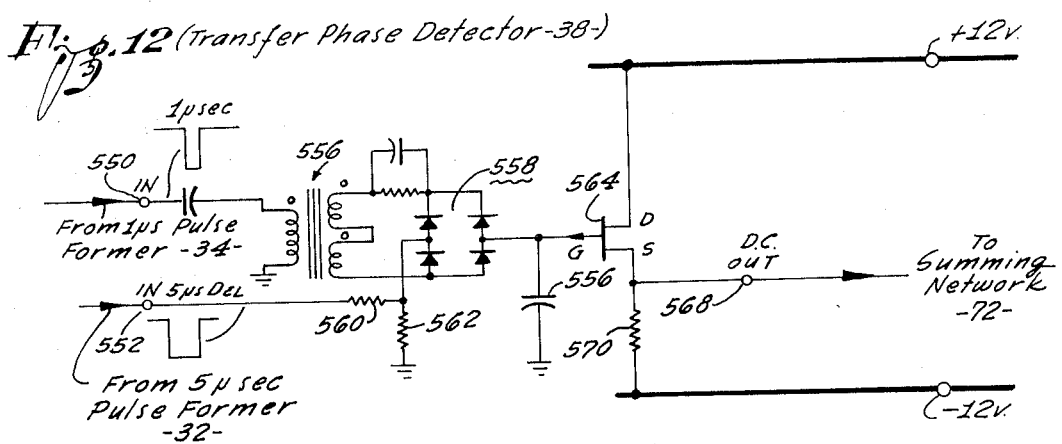
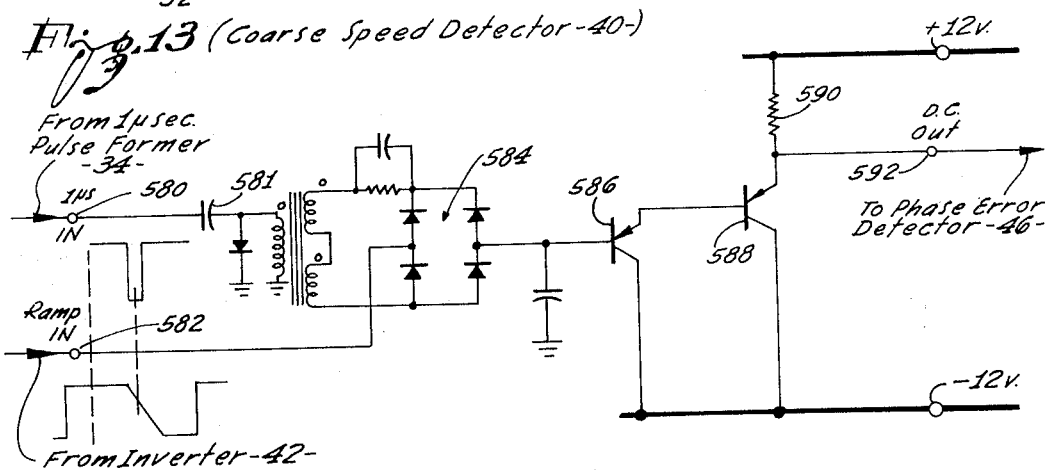
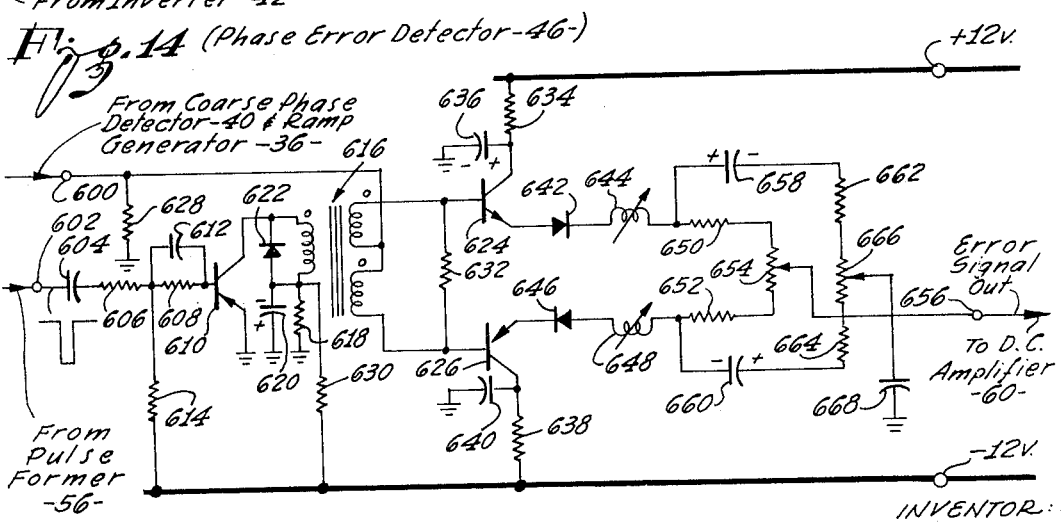

United States Patent Office 3,295,032
Patented Dec. 27, 1966

3,295,032
PLURAL MOTOR TENSION AND SPEED CONTROL
FOR A MAGNETIC TAPE DRIVE
Flavio S. C. Branco, Van Nuys, Calif., assignor to Winston Research Corporation, Los Angeles, Calif., a corporation of California
Filed May 24, 1963, Ser. No. 282,980
3 Claims. (Cl. 318—7)

The present invention relates to improved control systems, and it relates more particularly to an improved system for controlling the speed of a magnetic tape in a magnetic recorder or reproducer.

It is most important that the magnetic tape, or equivalent recording medium, in a magnetic recorder or reproducer be drawn past the transducer heads with constant linear velocity. Any variation in the speed of the tape either during the recording of information, or during playback, produces a distorting frequency modulation in the recorded and/or reproduced information.

Many attempts have been made in the prior art to cause the magnetic tape to be drawn with constant speed past the transducer heads. These attempts, for the most part, have involved expensive and complicated speed regulating systems, and expensive high inertia drive motors.

The control system of the present invention is relatively simple and it permits the use of light, inexpensive, low inertia drive motors. The control system to be described has general utility in the field of magnetic recorders and in other fields in which the speed of an electric motor is to be precisely controlled.

The control system of the invention is particularly adapted to the double capstan type of magnetic tape drive system, such as disclosed and claimed in copending application Serial No. 250,084, filed January 8, 1963, in the name of Albert C. Kirilouckas, and assigned to the present assignee, and the control system of the invention will be described in that environment.

An object of the present invention, therefore, is to provide an improved control system which is capable of controlling the drive of a magnetic tape and of holding the speed of the tape constant within extremely close tolerances.

Another object of the invention is to provide such an improved control system which is relatively simple and inexpensive to construct, and which may be readily incorporated into magnetic recorders and reproducers.

A more general object of the invention is to provide an improved control system which is capable of controlling the angular or linear speed of a member in a relatively simple and expeditious manner, and which uses generally available components and does not require especially constructed transducer heads, or the like.

A further object of the invention is to provide such an improved control system which enables the tension in the tape to be maintained essentially constant as it is drawn past the record/reproduce heads so as to avoid time displacement distortions in the recorded and/or reproduced signals.

The features of the invention which are believed to be new are set forth with particularity in the claims. The invention itself, however, together with further objects and advantages, may best be understood by reference to the accompanying drawings, in which:

FIGURE 1 is a block diagram representative of the improved control system of the invention, as applied to the double capstan type of tape drive system;

FIGURES 2A and 2B are curves useful in explaining the operation of the system of FIGURE 1;

FIGURE 3 is a schematic diagram representative of a modification in the control of one of the drive motors of the system of FIGURE 1;

FIGURE 4 is a further modification of the drive of one of the drive motors in the system of FIGURE 1;

FIGURE 5 is a fragmentary block diagram representing a modification for the system illustrated in FIGURE 1;

FIGURES 8–14 are circuit diagrams of the various components shown in block form in the system of FIGURE 1.

Figure 6:
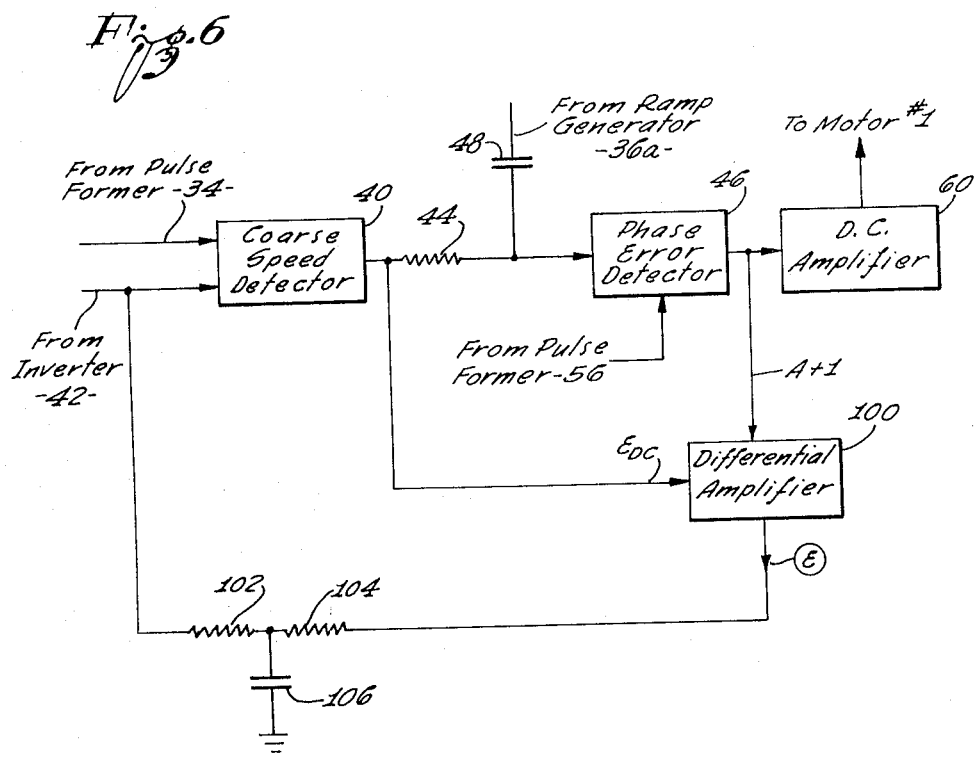
FIGURE 6 is a diagram, partly in block form and partly in circuit form, illustrating an additional control which may be incorporated into the system of FIGURE 5 to reduce transient effects.

In the system of FIGURE 1, a magnetic tape 10 is illustrated in fragmentary form as being drawn along a given path by means of a pair of capstans 12 and 14. The capstans 12 and 14 serve to draw the tape along the path, and these may be constructed in the manner described in detail in the aforementioned Kirilouckas application Serial No. 250,084.

The capstan 14 is driven to produce a torque opposite to the torque of the capstan 12, so that the capstan 14 acts as a dynamic brake. The capstan 14 places a particular tension on the tape 10, as the tape is drawn past the record/reproduce heads of the system. These heads are positioned between the capstans 12 and 14. They are not shown in the diagram of FIGURE 1 since they have no relation to the control system of the invention.

However, a reproduce head 16 is illustrated, and this head is magnetically coupled to one of the tracks on the magnetic tape 10. The particular track on the tape has a timing signal recorded on it, and this timing signal usually consists of a series of equi-spaced magnetic pulses. The pulses are recorded at a particular repetition frequency, so that the head 16 generates an electric signal which is in the form of a series of electric pulses. The repetition frequency of the reproduced pulses is indicative of the speed of the magnetic tape 10.

The capstan drive 12 also includes a tachometer drum 18 which in the illustrated embodiment comprises an annular magnetic member having magnetic signals inscribed about its peripheral surface. A reproduce head 20 is mounted adjacent the periphery of the drum 18, and this head serves to read the magnetic pulses inscribed on the drum. It is to be understood, of course, that the tachometer may be of any other suitable type, such as, electrostatic, optical, and the like.

The magnetic pulses recorded on the drum 18 preferably have the same repetition frequency when the capstan drive 12 is rotated, as the pulses recorded on the timing track on the magnetic tape 10. The purpose for the pulses on the tachometer drum 18 is to permit the head 20 to produce electrical speed control pulses during intervals when no pulses are produced by the head 16. These intervals may occur, for example, when the particular magnetic tape 10 does not include a timing track, or during a tape signal "Drop Out," or during the recording mode.

The reproduce head 20 is coupled to an amplifier 22 which, in turn, is coupled through a transfer switch 24 to an amplitude limiter 26. The amplitude limiter 26 is coupled to a usual frequency divider 28, which may be in the form of a binary counter. The frequency divider 28 has a plurality of output taps, and a movable arm 30 may be moved to engage selectively the different taps. The movable arm 30 is connected to a pair of pulse forming circuits 32 and 34.

The pulse forming circuit 32 produces, for example, pulses which occur in each cycle of the signal from the frequency divider 28 and which are delayed a particular interval "t" from the positive-going edge of that signal. These pulses may each have a duration of, for example, 5 microseconds. The pulse forming circuit 34, on the other hand, produces, during each cycle of the signal from the frequency divider, pulses having a duration of 1 microsecond, for example, and which are formed at the negative-going edge of the signal.

The pulse forming circuit 32 is coupled to a ramp generator 36 and to transfer phase detector 38. The pulse forming circuit 34 is connected to a coarse speed phase detector 40 and also to the transfer phase detector 38.

The ramp generator 36 is coupled through a phase inverter circuit 42 to the coarse phase detector 40. The output of the phase detector 40 is coupled through an isolating resistor 44 to one input terminal of a phase error detector 46. The ramp generator 36 is coupled through a capacitor 48 to the same input terminal of the phase error detector 46.

The system of FIGURE 1 includes a reference crystal oscillator 50. This oscillator may, for example, generate pulses which are precisely controlled to have an accurate repetition frequency. The repetition frequency of the pulses may, for example, be of the order of 200 kilocycles.

The crystal oscillator 50 is connected to a frequency divider 52 which may be in the form of a binary counter. The output taps of the frequency divider 52 produce pulses at different selected repetition frequencies, all precisely synchronized with the output pulses from the crystal oscillator 50. These pulses are used as clock pulses in the system of the invention.

A movable arm 54 may be associated with the output taps of the frequency divider 52, and this arm may be connected to a suitable recording transducer head 55. The transducer head 55 may be magnetically coupled to the tape 10 to inscribe the timing signals on the timing track of the tape, when the system is in its recording mode.

One of the taps of the frequency divider 52 is connected to a pulse forming circuit 56. This tap may, for example, apply pulses to the pulse forming circuit at the repetition frequency of 25 kilocycles. The output pulses from the pulse forming circuit 56 are applied to the phase error detector 46. The output from the phase error detector is applied to a direct current amplifier 60.

The direct current amplifier, in turn, is coupled to a motor 62 which supplies the driving power for the capstan drive 12. The motor 62 may be of the relatively inexpensive, low inertia type. The direct current amplifier 60 may include a usual stabilizing network for stabilizing the control system loop and to prevent "hunting."

A drop-out switch 64 is connected to the direct current amplifier 60, and this switch is normally closed. However, when the drop-out switch 64 is open, it removes the input from the direct current amplifier, and it substitutes the input from a usual capacitor type memory 66. During normal operation, when the drop-out switch 64 is closed, the memory 66 is charged to a particular potential level by the error signal applied to the direct current amplifier 60.

The timing transducer head 16 is also coupled to a threshold detector 70, the output of which is applied through a capacitor 71 to the drop-out switch 64 so as to cause the switch 64 to open when the output from the threshold detector drops below a predetermined level.

The output from the threshold detector is also connected to a usual summing network 72, as is the output from the transfer phase detector 38. The summing network 72 provides a control current to the transfer switch 24.

When the system of the invention is first placed in operation, the reproduce head 20 senses the magnetic signals on the tachometer drum 18. The amplifier 22, therefore, produces a series of output pulses whose frequency is related to the speed of rotation of the motor 62. The transfer switch 24 is normally conditioned to pass the pulses from the amplifier 22 through the amplitude limiter 26 to the frequency divider 28.

The arm 30 is set to a selected tap on the frequency divider 28, so that a square wave illustrated by the waveform "A" in FIGURE 1 may be introduced to the pulse forming networks 32 and 34. The pulse forming network 32 produces 5 microsecond output pulses, an indicated by the waveform "B" in FIGURE 1, these pulses each occurring with a time delay "t" after the positive-going edge of each cycle of the square wave "A." The 5 microsecond delayed pulses from the pulse forming network 32 are applied to the ramp generator 36 and to the transfer phase detector 38, as mentioned above.

Likewise, the 1 microsecond pulse forming network 34 responds to the square wave "A" to produce a 1 microsecond pulse "C" during each negative-going transition of the square wave. These 1 microsecond pulses are applied to the transfer phase detector 38 and to the coarse speed phase detector 40, as mentioned above.

The delayed 5 microsecond pulses "B" from the pulse forming network 32 applied to the ramp generator 36 causes the ramp generator to produce an output signal having the wave form shown in the curve "D." This signal is passed through the inverter network 42, so that the phase inverted signal "E," corresponding to the signal "D," but displaced 180° therefrom, is applied to the coarse speed phase detector 40.

The 1 microsecond pulses "C" from the pulse forming network 34 are compared with the inverted ramp signal from the inverter 42 in the coarse speed phase detector 40. The result is a direct current voltage from the coarse speed phase detector which, as illustrated by the curve "F," drops to a relatively low level when the speed of the system is below the synchronous speed, and rises to a relatively high level when the speed of the system is above the particular synchronous speed.

It should be pointed out that the control described for the coarse speed control of the motor 62 is a frequency control type of system, in that the coarse adjustment for the speed of the motor 62 depends upon the speed of the system being above or below a selected speed, and does not depend upon the phase comparison of the control frequency which is a direct function of the speed with a reference signal.

This is because the ramp signal developed by the ramp generator 36 is triggered by the pulses from the pulse forming network 32, and the pulses compared with the ramp signal in the coarse phase detector 40 are derived from the pulse forming network 34.

The pulses from the pulse forming network 32 are triggered by the positive-going edges of the square wave "A" and after a fixed time delay "t." The pulses from the pulse forming network 32, on the other hand, are triggered by the negative-going edges of the square wave "A."

Therefore, the phase relationship between the ramp signal generated by the generator 36 and the pulses generated by the pulse forming network 34 in any particular cycle of the square wave "A" will depend on the period "T" of the square wave which, in turn, will depend upon the frequency.

The coarse detector 40 compares the ramp signal and the pulses from the network 34 to produce a direct current voltage. This voltage is used as a coarse adjustment for the speed of the motor 62 so as to maintain the speed at a particular value which provides a particular frequency to the square wave "A."

However, although the coarse speed control requires no independent reference signal, in a manner to be described, a phase comparison with a reference clock signal is made for the fine control of the speed of the motor 62.

The resulting direct current output "F" from the coarse phase detector 40 is applied through the isolating resistor 44 to the phase error detector 46. The ramp signal "D" from the ramp generator 36 is also applied to the phase error detector 46. The resulting input to the coarse phase detector is a composite wave, such as shown in FIGURE 2A, in which the ramp signal "D" is superimposed on the direct current signal "F," and raises and falls in the illustrated manner, as the speed of the motor varies from the speed which provides the selected synchronous frequency $f_0$.

It will be appreciated that when the speed of the system is materially below the selected speed which corresponds to the frequency $f_0$, the direct current voltage curve "F" of FIGURE 2A will be at its low level. The fact that the direct current voltage curve "F" is at its low level, will cause the direct current amplifier 60 to impress a signal on the motor 62, such that the motor speeds up. Conversely, when the system is operating materially above the speed which produces the selected frequency $f_0$, the direct current voltage curve "F" will be at its high level. This causes the error signal applied to the direct current amplifier 60 to be such that the direct current amplifier applies a signal of reduced amplitude to the motor 62 to cause it to slow down.

In the above described manner, the direct current voltage output from the coarse phase detector 40 of the curve "F" of FIGURE 2A controls the motor 62 to bring it within the range of the fine speed control. When it is in the latter range, the reference clock pulses of FIGURE 2B ride on the sloping portion of the wave form "D." Then, so long as the synchronous speed is kept within the range of the fine speed control, any tendency for the speed to change, causes the clock pulse to sample amplitudes up or down the slope of the particular curve "D," so as to produce an error voltage which causes the direct current amplifier 60 to correct for the change.

The coarse speed phase detector system described above, therefore, is effective in bringing the speed of the motor 62 automatically within the range of the fine speed control. The fine speed control phase error detector 46 then provides a precise control on the motor 62, so that it is held at a fixed speed, within relatively close tolerances.

As mentioned above, the transfer switch 24 is normally connected to the amplifier 22. However, after the system has been in operation for a certain time interval, the 1 microsecond pulses from the pulse former 34 applied to the transfer phase detector 38 appear substantially in phase with the 5 microsecond pulses from the pulse former 32, so that the transfer phase detector 34 produces an output voltage.

The above mentioned output voltage from the transfer phase detector 34 causes a switching current $i/2$ to flow through the summing network 72 and into the transfer switch 24. However, this $i/2$ current in itself is not sufficient to actuate the switch.

Now, should the timing head 16 encounter a timing track on the tape 10, the resulting signal produced by the head causes the threshold detector 70 also to produce an output voltage. The latter output voltage also causes a current $i/2$ to flow through the summing network 72 and into the switch 24. The resulting summation current $i$ is sufficient to actuate the switch, so that it connects the amplitude limiter 26 to the head 16.

Therefore, during this latter operation, the control system is referenced by the actual speed of the tape, for increasing the precision with which the tape speed is controlled. However, such a control is not effectuated until a timing track on the tape is actually encountered by the head 16, and until the speed control system itself is operating properly, as indicated by the required output from the transfer phase detector 38.

Once the control of the system of FIGURE 1 is referenced to the timing track on the tape 10, it is undesirable to return to the tachometer drum control, unless a material interruption occurs in the tape timing signal from the head 16. That is, each momentary interruption of the timing signal from the tape 10 should not return the system to the control of the tachometer drum 18.

To carry out the above mentioned requirement, the threshold detector 70 is caused to apply a switching current to the drop-out switch 64. So long as the switching current is derived from the threshold detector 70, indicating that the head 16 is reproducing signals from the timing track on the tape 10, the drop-out switch 64 is held closed, so that the system operates normally.

However, should there be a momentary interruption in the timing signal reproduced from the tape 10, the drop-out switch 64 will open. This permits the signal from the memory 66 to be used in the control of the motor 62, and this signal corresponds to the amplitude of the last signal applied to the direct current amplifier 60, before the break occurs.

The control of the drop-out switch 64 is such that interruptions in the timing signal lasting, for example, up to 100 milliseconds will permit the memory 66 to provide the reference level for the drive of the motor 62. However, for longer intervals of time, the control discontinues, and the switch 64 again closes. At this time, the switch 24 returns the system to the tachometer drum 18, so that the control continues as reference to the tachometer drum.

The use of the memory 66 permits the system of FIGURE 1 to undergo a transition between the timing track readings on the tape 10 and the readings from the tachometer drum 18, without excessive and abrupt speed control changes being exerted on the motor 62. In addition, the drop-out switch 64 and memory 66 take care of brief interruptions in the timing signal on the tape 16 without returning the control of the motor 62 to the tachometer drum.

As mentioned above, the capstan drive 14 is driven so as to produce a torque opposite to the torque exerted by the capstan drive 12, thereby to provide the desired tension on the tape 10. The capstan 14 may be driven by an appropriate motor 80 which may be similar to the motor 62. The motor 80 may be driven by any appropriate constant current source 82, for example, through an isolating resistor 84. It will be appreciated that any control changes exerted on the motor 62 by the control system should also be exerted on the motor 80, so as to prevent excessive tensioning and/or slackening of the portion of the tape 10 between the capstan drives 12 and 14, which would otherwise produce erroneous time displacements of the information read from, or recorded on, the tape, between the capstan drives.

This latter control may be effectuated through a capacitor 86 which couples the output from the direct current amplifier 60 to the motor 80. The use of the coupling capacitor 86 causes changes in the output of the amplifier 60 to be introduced to the drive of the motor 80, so that the speed of the motor 80 can be increased and decreased concurrently with any increases or decreases in the speed of the motor 62.

The control described above provides that the motors 80 and 62 will operate in unison to maintain an essentially constant tension on the portion of the tape 10 between the two capstan drives 12 and 14. It will be remembered that this is the critical portion of the tape 10 which is drawn across the record and reproduce heads of the tape recorder in which the control system of the invention is incorporated.

The above described control of the motor 80 through the capacitor 86 does not take care of changes in tape tension due to mechanical imperfections in the motor 62. It is therefore more desirable to have the motor 80 respond to actual changes in tension in the tape 10, rather than to control changes of the motor 62. The latter type of control system is indicated schematically, for example, in FIGURE 3.

In the system of FIGURE 3, the coupling through the capacitor 86 is replaced by a tension transducer 90. This tension transducer is coupled to the magnetic tape 10, and it serves to convert any changes in tension in the tape to corresponding electrical signals.

Tension transducers, in themselves, are well known to the magnetic recorder art. The resulting signals from the transducer 90 are applied to an amplifier 92, and such signals are introduced to the motor 80. These latter signals serve to increase or decrease the speed of the motor 80 in response to any changes in tension on the tape 10 in the vicinity of the capstan drive 14.

It will be appreciated that the tape tension control system of FIGURE 3 is more accurate in maintaining a constant tape tension than the control of the motor 80 in the system of FIGURE 1. This is because the control in the system of FIGURE 3 is referenced to actual changes in the tape tension, rather than to the control signal of the motor 62 which could tend to produce erroneous tension changes, as was the case with the system of FIGURE 1. This is because the control signal of the motor 62 may include speed corrections not needed at the motor 80 and which, when applied to the motor 80, produce tension differentials in the tape.

Yet another modification of the system of FIGURE 1 for controlling the motor 14 is illustrated fragmentarily in FIGURE 4. The embodiment of FIGURE 4 includes, an addition to the above-described components of the system of FIGURE 1, a reproduce head 96 which also senses the timing tracks on the tape 10, like the head 16. The signals produced by the head 96 are formed into 1 microsecond pulses in a pulse forming network 97.

The resulting pulses from the pulse former 97 are applied to a phase comparator 98, and the output from the phase comparator is introduced to an amplifier 99. The ramp signal produced by the ramp generator 36 of FIGURE 1 is also introduced to the phase comparator 98 through a resistance/capacitance coupling network 100.

It will be appreciated that the ramp signal applied from the ramp generator 36 to the phase comparator 98 is referenced to the timing pulses produced in the system of FIGURE 1 from tape timing signals sensed by the head 16 adjacent the capstan 12; whereas the pulses applied to the phase comparator 98 by the pulse forming network 97 are referenced to the timing pulses sensed by the head 96 adjacent the capstan drive 14. Any change in the phase of the ramp signal and the pulses represent elongations and/or contractions in the tape 10 due to tension variations imparted to the tape.

The system of FIGURE 4 responds to the above mentioned phase changes to apply an error signal from the phase comparator 98, through the amplifier 99 and capacitor 86 to the drive motor 80. This error signal controls the speed of the drive motor 80 in a dynamic manner to oppose any such phase change and, therefore, serves to maintain the tension in the tape 10 between the capstans 12 and 14 essentially constant.

In the speed control system of FIGURE 1, and in the manner described, the control is initially exerted by the signals on the tachometer drum 18. Then, when the system is brought up to speed, and synchronization is achieved, the transfer switch 24 causes an automatic switch-over to the signals from the head 16, so that the timing signals on the tape become the source of control in the system.

The use of the tape timing signals in the system of FIGURE 1 produces a more accurate speed control for the drive motors of the system. This is because the timing signals on the tape are related directly to the speed of the tape, and it is that speed which must be accurately and precisely controlled.

However, certain problems arise in the system of FIGURE 1, in that it is possible for the timing signals on the tape to be lost, as mentioned above. When that occurs, and unless some provision is made, there is no control on the drive motor 62, so that the drive motor has a tendency to be driven at excessive speeds.

In an effort to overcome the afore-mentioned tendency, the memory 66 is provided in the system of FIGURE 1. The system of FIGURE 5 achieves the same result in a different manner. The coarse speed control portion of the system of FIGURE 5, unlike the system of FIGURE 1, is permanently timed by the timing signals on the tachometer drum 18, and only the fine control portion is ever timed by the timing channel on the tape 10.

In the system of FIGURE 5, should anything happen to the tape timing signals, the system comes under the sole control of the signals recorded on the tachometer drum 18. This means that the system continues to operate at a speed closely synchronized to its normal operating speed, even though actual control by the tape signal is lost. The system of FIGURE 5, therefore, does not require the memory 66, nor the components associated with that memory, as described in conjunction with FIGURE 1.

In the system of FIGURE 5, certain components, already discussed in conjunction with FIGURE 1, and not essential to a clear understanding of the modified system, have been omitted. Other components of the system of FIGURE 1, repeated in the system of FIGURE 5, have been given the same numerals to which the components were referenced in the system of FIGURE 1.

In the system of FIGURE 5, the amplifier 22 is directly connected to the amplitude limiter 26, and the amplitude limiter 26 is connected to the components 28, 32, 34, 36 and 42 described in conjunction with the system of FIGURE 1. These latter components are coupled to the coarse phase detector 40.

The transfer switch 24 is connected to an amplitude limiter 26a which, in turn, is coupled to a frequency divider 28a. The frequency divider 28a is coupled to a 5 microsecond delayed pulse forming network 32a which, in turn, is connected to a ramp generator 36a.

The coarse speed phase detector 40 is connected through the resistor 44 to the phase error detector 46, as before, and the ramp generator 36 is coupled through the capacitor 48 to the phase error detector. The components 26a, 28a, 32a, and 36a mentioned above, are respectively similar to the components 26, 28, 32 and 36 described in conjunction with the system of FIGURE 1.

It will be appreciate that, in the manner described above, the coarse speed phase detector 40 is under the control of the pulses derived from the amplifier 22. However, unlike the system of FIGURE 1, when the system is brought up to speed, the coarse speed phase detector 40 remains under the control of these pulses which, in turn, are timed by the pulses derived from the tachometer drum 18.

The only change which takes place when the system is brought up to speed, and when a speed control track is sensed on the tape 10, is that the transfer switch 24 switches the amplitude limiter 26a, from the output of the amplifier 22 to the output from the head 16. This means, that after the synchronized condition is achieved, and a timing track on the tape 10 has been sensed, the ramp generator 36a is timed under the control of the pulses on the tape timing track.

Therefore, the coarse speed control signal applied to the phase error detector 46 remains under the control of the tachometer drum 18 at all times, so that a loss of the tape timing signal does not materially affect the speed of the drive motor 62.

However, the fine control exerted by the signal from the ramp generator 36a is under the control of the tape timing signal under normal operating conditions. Should the latter timing signal be lost, the signal from the ramp generator 36 become ineffective. However, the system continues to operate at a near normal speed, because of the control by the coarse phase detector 40.

Figure 7:
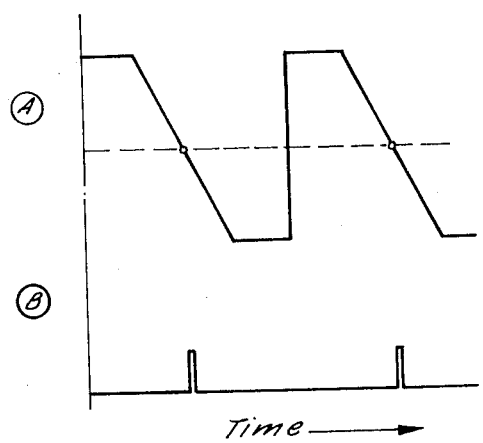
FIGURE 7 is a representation of a series of curves representing certain wave forms in the system of FIGURE 6, and which are useful in explaining the operation of the system of FIGURE 6.

With reference to FIGURE 7, the signal on the curve "A" is the ramp signal derived from the ramp generator 36a, and the pulses of the curve "B" are the timing pulses derived from the pulse forming network 56. In the manner described above, the latter pulses sense various points on the ramp signal of the curve "A" which, in turn, is superimposed on the signal from the coarse speed phase detector, in the manner illustrated in FIGURE 2A.

If the sampling point of the pulses of the curve "B" of FIGURE 7 is other than on a particular level of the ramp signal of the curve "A" in FIGURE 7; a sudden loss of the ramp signal will produce a transient, due to the resulting change in voltage input to the error detector. Therefore, it is important that the sampling of the ramp signal by the pulses of the curve "B" of FIGURE 7 be held to a level of the ramp signal of the curve "A," corresponding to the average value of the ramp waveform. If that is achieved, the momentary loss of the ramp signal will produce no abrupt potential change at the input of the error detector which, as mentioned, could give rise to the undesired transient.

The system shown in FIGURE 6 includes a closed loop servo system which is associated with the phase error detector 46. The illustrated servo system of FIGURE 6 is intended to control the signals fed to the phase error detector 46, so that the sampling by the block pulses always occurs at the cross-over point of the ramp signal from the ramp generator 36a. This will assure that any sudden loss in the tape timing signal will not cause undesired transients to occur in the system. It should be pointed out that such momentary losses of signal are typical of magnetic recording reproduction.

In the system of FIGURE 6, a differential amplifier 100 is coupled to the output of the phase error detector 46 and to the output of the coarse speed detector.

Any difference in the outputs from the detectors 40 and 46 means that the sampling by the timing pulses of the curve "B" of FIGURE 7 is at a point other than a cross-over point. This causes the differential amplifier 100 to generate an error signal "E."

The error signal "E" is applied to an integrating network which includes a pair of series resistors 102 and 104, the common junction of which is connected to a grounded capacitor 106. The resulting integrated error voltage from the integrator network is applied to the lead extending to the coarse phase detector 40 from the inverter 42.

The above mentioned integrated error signal has an effect of changing the level of the coarse speed detector in a direction such that the cross-over point of the ramp signal of the curve "A" in FIGURE 7 is shifted to a point at which the sampled potential approaches zero. In this manner, any break in the ramp signal of FIGURE 7 does not produce the aforementioned undesired abrupt transient voltage changes in the system.

The circuit details of the tape transfer switch 24 of FIGURE 1 are shown in FIGURE 8. The input terminal 200 of the switch receives the switching current $i$ from the summing network of FIGURE 1. The terminal 200 is connected to a manually operated switch 202, which has three distinct positions.

In a first position of the switch 202, the input terminal 200 is connected to the anode of a Zener diode 203 for normal operation of the system. In a second position of the switch, the anode of the Zener diode is connected to a common lead 204 for connecting the output terminal of the switch to the reproduce head 16. For a third position of the switch 202, the anode of the diode 202 is connected to a resistor 206 for connecting the output terminal of the switch to the tachometer drum 18 through the amplifier 22.

The resistor 206 may have a resistance of 10 kiloohms, for example, and it is connected to a common lead 208. The common lead 208 is connected to the negative terminal of a 12-volt direct voltage source, whereas the common lead 204 is connected to a point of reference potential, such as ground.

The tape transfer switch 24 of FIGURE 8 includes a pair of PNP transistors 210 and 212. The transistors are connected in a monostable type of multivibrator circuit. When the switch 202 is set to its normal position, the circuit of the transistors 210 and 212 is such that the transistor 210 is conductive (saturated), and the transistor 212 is non-conductive (cut-off). The multivibrator remains in this state, until a switching current $i$ of sufficient amplitude is received to cause the multivibrator to assume its second unstable state. In its second state, the conductivity of the transistors 210 and 212 is reversed. The multivibrator is held in its unstable state, when the switch 202 is in its first position, so long as the switching current $i$ exceeds a predetermined threshold.

When the switch 202 is moved from its first position to either one of its other two positions, the multivibrator circuit formed by the transistors 210 and 212 is caused to assume one or the other of its two states; and it remains in the particular state so long as the switch 202 remains in the corresponding position.

The transfer switch circuit of FIGURE 8 includes a further input terminal 214 which is connected to the head 16, and it includes an input terminal 216 which is connected to the amplifier 22. These latter input terminals are coupled through appropriate 1 microfarad coupling capacitors 218 and 220 to a diode switching network 222. The diode switching network is coupled through a .1 microfarad capacitor 224 to an output terminal 226. The output terminal 226 is connected to the amplitude limiter 26 of the system of FIGURE 1.

The collectors of the transistors 210 and 212 are connected through resistors 228 and 230 to the diode switching network 222. A balancing potentiometer 232 is included in circuit with the resistor 230. The resistor 228 may, for example, have a resistance of 6.8 kilo-ohms, and the resistor 230 may have a resistance of 3.3 kilo-ohms.

The transfer switch 24 of FIGURE 8 operates in a known manner to cause the diode network 222 selectively to couple the input terminal 214 or the input terminal 216 to the output terminal 226. This control is effectuated by the corresponding state of the multivibrator formed by the transistors 210 and 212.

As mentioned above, under the control of the switching current $i$ at the input terminal 200, the multivibrator is actuated between its two conditions, so as to actuate the diode switching network in a corresponding manner. Alternately, the manual switch 202 can be turned to hold the multivibrator in either of its two conditions, so as to provide either a connection between the head 16 and the amplitude limiter 26, or between the amplifier 22 and the amplitude limiter 26, whichever is desired.

The delayed pulse forming network 32 is shown in circuit detail in FIGURE 9. This network includes an input terminal 300 which receives the square wave "A" from the frequency divider 28. The terminal 300 is connected to a coupling capacitor 302 which, in turn, is connected to the anode of a diode 304 and to a grounded resistor 306. The coupling capacitor 270 may have a capacity of 270 micro-microfarads, and the resistor 306 may have a resistance of 10 kilo-ohms.

The cathode of the diode 304 is connected to the base of a transistor 308. The transistor 308 and a second transistor 310 are connected as a multivibrator circuit. Both these transistors may be of the PNP type and may be of the Fairchild type presently designated 2N995.

The emitters of the transistors 308 and 310 are connected to a common grounded resistor 312 which is shunted by a capacitor 314. The resistor 312 may have a resistance of 220 ohms, and the capacitor 314 may have a capacity of .003 microfarad.

The collector of the transistor 308 is connected to the base of the transistor 310 through a capacitor 316. The capacitor 316 may have a capacity of 150 micro-microfarads, and it is shunted by a 6.8 kilo-ohm resistor 218. The collector of the transistor 310 is coupled to the base of the transistor 308 through a capacitor 320 which may, for example, have a capacity of .003 microfarad.

The collectors of the transistors 308 and 310 are connected to the negative terminal of the 12-volt source through respective resistors 322 and 324, each having a resistance of 1.5 kilo-ohms. The base electrode of the transistor 308 is connected to the negative terminal through series resistors 326 and 328 and through a series potentiometer 330 which serves as an adjustment for the delay characteristics of the circuit. The resistor 326 may have a resistance of 1 kilo-ohm, the potentiometer 330 may have a resistance of 5 kilo-ohms, and the resistor 328 may have a resistance of 4.7 kilo-ohms.

The common junction of the resistors 326 and 330 is connected to the anodes of respective diodes 332 and 334, the cathodes of which are connected back to the collectors of the respective transistors 310 and 308. A Zener diode 338 is connected from the anodes of the diode 334 and 336 to ground.

The collector of the transistor 308 is connected to a resistor 340 which, in turn, is connected through a capacitor 342 to a resistor 344 and to the base of PNP transistor 346. The resistor 340 may have a resistance of 1 kilo-ohm, and the capacitor 342 may have a capacity of .01 microfarad. The resistor 344 is connected to the negative terminal of the 12-volt source, and it may have a resistance of 47 kilo-ohms.

The transistor 346 may be of the PNP type, and its emitter is connected to ground. The collector of the transistor 346 is connected through a parallel resonant ringing circuit 348 and through a resistor 350 to the negative terminal of the 12-volt source. The resistor 350 may have a resistance, for example, of 1.5 kilo-ohms.

The resonant circuit 348 includes a capacitor 352 and a shunting variable inductance coil 354. These two elements are shunted by a diode 356. The capacitor 352 may have a capacity of 470 micro-microfarads, and the variable inductance coil 354 may have an inductance of 4–5 microhenries. The inductance coil is made adjustable, so as to adjust the width of the pulse formed by the pulse forming circuit of FIGURE 9.

The collector of the transistor 346 is coupled through a pair of capacitors 360 and 362 to the base electrode of a transistor 364. The capacitor 360 may have a capacity of .01 microfarad, and the capacitor 362 may have a capacity of 330 micro-microfarads. The capacitor 362 is shunted by a 10 kilo-ohm resistor 366.

The multivibrator formed by the transistors 308 and 310 is triggered by the positive going edges of the square wave "A," and the multivibrator generates a series of output pulses in response thereto, each have a width determined by the setting of the potentiometer 330. The trailing edges of the latter pulses cause the transistor 346 to be cut-off so as to shock excite the resonant circuit 348. The diode 356 damps the signal across the resonant circuit 248 after the first half cycle, so that a series of delayed pulses are produced across the resonant circuit.

The transistor 364 and a further transistor 365 are connected as pulse amplifiers and shaper networks. The base of the transistor 364 is connected to a grounded 10 kilo-ohm resistor 370, and the emitter of the transistor is grounded. The transistor 364 is of the PNP type, and its collector is connected through a 1.5 kilo-ohm resistor 372 to the negative terminal of the 12-volt source.

The collector of the transistor 364 is also connected through a pair of capacitors 374 and 376 to the base of the transistor 365. The latter transistor is of the NPN type. The capacitor 376 is shunted by a 1 kilo-ohm resistor 380. The capacitor 374 may have a capacity of .01 microfarad, and the capacitor 376 may have a capacity of 390 micro-microfarads.

The base of the NPN transistor 378 is connected through a 10 kilo-ohm resistor 382 to the negative terminal of the 12-volt source, and the emitter of the transistor is directly connected to that terminal.

The collector of the transistor 378 is connected to a 1.5 ohm grounded resistor 384 and to the base of a pair of transistors 386 and 388. These latter transistors are connected as complementary emitter followers, so as to provide a low impedance drive for both positive and negative outputs. The transistor 386 is of the NPN type, and the transistor 388 is of the PNP type. The collector of the transistor 388 is connected to the negative terminal of the 12-volt source, and the collector of the transistor 386 is grounded.

An output terminal No. 1 for the circuit is connected to the common emitters of the transistors 386 and 388. The delayed 5 microsecond pulses are produced at this output terminal and are applied to the transfer phase detector 38. The pulse forming network 32 has a second output terminal #2 which is connected to the collector of the transistor 308. The second output terminal supplies an inverted output pulse to the ramp generator 36.

The ramp generator 36 is shown in FIGURE 10, and this circuit includes an input terminal 400 which receives the pulses from the #2 output terminal of the pulse forming network of FIGURE 9.

The input terminal 400 of the ramp generator is connected to a coupling capacitor 402 which has a capacity of 1 microfarad. The coupling capacitor 402 is connected through a 1 kilo-ohm resistor 404 to the base of a grounded PNP transistor 406. The resistor 404 is shunted by a 1,000 micro-microfarad capacitor 408.

The base of the transistor 406 is connected to the negative terminal of the 12-volt source through a 47 kilo-ohm resistor 410.

The collector of the transistor is connected to a 910 ohm resistor 412 and to the base of a PNP transistor 414. The resistor 412 is connected to a 250 ohm potentiometer 416 which serves as a ramp width adjustment. The potentiometer is connected to the junction of a 1 kilo-ohm resistor 418 and the emitter of an NPN transistor 420. The resistor 418 has a resistance, for instance, of 1 kilo-ohm.

The base of the transistor 414 is connected to a grounded capacitor 422 which has a capacity, for example, of 510 micro-microfarads. A 330 micro-microfarad capacitor 424 is connected between the base and the emitter of the transistor 414.

The emitter of the transistor 414 is connected to a 10 kilo-ohm resistor 426 and to the base of the transistor 420. The resistor 426 and the collector of the transistor 420 are connected to the positive terminal of the 12-volt source.

The emitter of the transistor 420 is connected to the anode of a Zener diode 428 and to an output terminal 430. The cathode of the Zener diode is grounded.

The capacitor 422 forms the main circuit element of the ramp generator. This capacitor is normally in a discharged state, as the transistor 406 is normally biased to its fully conductive saturated condition. However, for each delayed pulse "B" applied to the input terminal 400, the transistor 406 is driven to cut-off, and the capacitor 422 begins to charge. The circuit including the resistor 412 and potentiometer 416 forms a boot-strap feedback network to linearize the voltage developed across the capacitor 422 as it charges up. The transistors 414 and 420 serve as emitter followers, and the Zener diode 428 serves as a clamp.

The circuit of FIGURE 10, therefore, responds to the delayed pulses from the pulse forming network 34 to produce the ramp signal "D" at its output terminal 430. The width of the ramp can be adjusted by appropriate adjustment of the potentiometer 416.

The 1 microsecond pulse forming network 34 or 56 is shown in FIGURE 11. This latter network includes an input terminal 500 which, for example, receives the square wave "A" from the frequency divider 28. The input terminal 500 is connected to a 470 ohm resistor 502 which, in turn, is coupled through a .01 coupling capacitor 504 to the base of PNP transistor 506 and to a 47 kilo-ohm resistor 508. The resistor 508 is connected to the positive terminal of the 12-volt source.

The emitter of the transistor 506 is grounded, and its collector is connected through a parallel resonant ringing circuit 510 to a resistor 512. The resistor 512 has a resistance of 1.5 kilo-ohms, for example, and it is connected to the positive terminal of the 12-volt source. The resonant ringing circuit 510 is shunted by a diode 514. A grounded 33 microfarad capacitor 516 is connected to the junction of the resistor 512 and the resonant circuit 510.

The circuit of FIGURE 10 thus far described responds to the square wave input circuit to shock excite the resonant circuit 510 for each positive-going half cycle of the square wave input signal. However, the diode 54 damps the tuned circuit at the end of the first half cycle, so that a sharp pulse is produced in the output circuit of the transistor 506 for each positive going half cycle of the square wave input.

The collector of the transistor 506 is connected through a coupling capacitor 520 of, for example, .01 microfarad and through a 4.7 kilo-ohm resistor 522 to the base of an NPN transistor 524. The resistor 522 is shunted by a 120 micro-microfarad capacitor 526.

The base of the transistor 524 is connected to a 10 kilo-ohm resistor 528 which, in turn, is connected to the negative terminal of the 12-volt source. The emitter of the transistor 524 is connected directly to the negative terminal.

The collector of the transistor 524 is connected to the base electrodes of a pair of transistors 530 and 532. The transistor 530 is of the NPN type and has a grounded collector, and the transistor 532 is of the PNP type and has a collector connected to the negative terminal of the 12-volt source. The base of the transistor 532 is connected to a 1.5 kilo-ohm resistor 534 which, in turn, is connected to a grounded inductance coil 536 which may, for example, have an inductance of 200 microhenries. The emitters of the transistors 530 and 532 are connected to an output terminal 540 at which the 1 microsecond pulses "C" appear.

The pulse forming network of FIGURE 11 is essentially similar to the pulse forming network in the circuit of FIGURE 9. The square wave 'A" from the frequency divider is applied to the input terminal 500, and this square wave periodically renders the transistor 506 non-conductive. Each time the transistor 506 is swung to its non-conductive state, a shock excited signal appears across the ringing circuit 510. However, the diode 514 damps out the signal after its first half cycle. Therefore, a series of pulses appear across the resonant circuit 510.

The transistor 524 acts as a pulse amplifier and pulse shaper circuit, and the transistors 530 and 532 are connected as a symmetrical emitter follower circuit. Therefore a corresponding series of sharp pulses "C," each having a duration, for example, of 1 microsecond, appears at the output terminal 540 for application to the coarse phase detector 40 and to the transfer phase detector 38.

The pulses from the pulse forming circuit 34 of FIGURE 11, and from the pulse forming circuit 32 of FIGURE 10, are applied to the respective input terminals 550 and 552 of the transfer phase detector circuit 38 of FIGURE 12.

The input terminal 550 is connected through a coupling capacitor 554 to the primary winding of a transformer 556. The transformer 556 has a pair of secondary windings which are connected together and to a usual phase discriminator circuit 558.

The input terminal 552 is connected through a resistor 560 to a grounded resistor 562, the common junction of these resistors being connected to a pair of diodes in the phase discriminator circuit. The output from the phase discriminator is connected to the gate electrode of a field effect transistor 564 and to a grounded capacitor 566.

The source electrode of the field effect transistor is connected to an output terminal 568, whereas the drain electrode is connected to the positive terminal of the 12-volt source. The source electrode is also connected to a resistor 570 which is connected to the negative terminal of the 12-volt source. The transfer phase detector produces a direct current output at the output terminal 568, which, as described above, is applied to the summing network 72.

It will be remembered that only when the input pulses applied to the respective input terminals 550 and 552 are in phase, does the transfer phase detector circuit produce sufficient current at its output terminal to combine with the current from the threshold detector 70 of FIGURE 1 to actuate the switch 24.

The coarse speed detector 40 is shown in FIGURE 3, and this circuit includes a first input terminal 580 which receives the 1 microsecond pulses from the pulse forming circuit 34, and it includes a second input terminal 582 which receives the ramp signals from the inverter 42.

The input terminal 580 is coupled through a capacitor 581 to a usual phase detector circuit 584. The input terminal 582 is connected to a pair of diodes in the phase detector circuit. The output from the phase detector circuit 584 is applied to a PNP transistor 586 which is connected to a PNP transistor 588 in a Darlington type emitter follower circuit.

The collector is connected to the negative terminal of the 12-volt source, and the emitter is connected through a resistor 590 to the positive terminal. The direct current output from the coarse speed detector 40 is derived at an output terminal 592 connected to the emitter of the transistor 588, and this output is applied to the phase error detector 46.

The phase error detector 46 is shown in circuit detail in FIGURE 14. The detector includes a first input terminal 600 which receives the input from the coarse phase detector 40 and from the ramp generator 36. The phase error detector also includes a second input terminal 602 which receives the 1 microsecond pulses from the pulse forming circuit 56.

The input terminal 602 is connected to a capacitor 604 which, in turn, is connected through a pair of resistors 606 and 608 to the base of a PNP grounded emitter transistor 610. The capacitor 604 may have a capacity of 1 microfarad, the resistor 606 may have a resistance of 560 ohms, and the resistor 608 may have a resistance of 2.4 kilo-ohms. The resistor 608 is shunted by a capacitor 612 which may have a capacity of 1000 micro-microfarads, and the junction of the resistors 608 and 610 is connected to a grounded 240 kilo-ohm resistor 614.

The collector of the transistor 610 is connected to the primary winding of a transformer 616. The other terminal of this winding is connected to a grounded 20 kilo-ohm resistor 618 which is shunted by a capacitor 620. The primary winding is shunted by a diode 622.

The transformer 616 has a pair of secondary windings which are connected together and to the base electrodes of a pair of transistors 624 and 626. The transistor 624 is of the NPN type, and the transistor 626 is of the PNP type.

The input terminal 600 is connected to a 1 kilo-ohm grounded resistor 628 and to the common junction of the secondary windings of the transformer 616. The primary of the transformers 616 is also connected to a 3.3 kilo-ohm resistor 630 which is connected to the negative terminal of the 12-volt direct voltage source.

The base electrodes of the transistors 624 and 626 are interconnected by a 3.9 kilo-ohm resistor 632. The collector of the transistor 624 is connected through a 100 ohm resistor 634 to the positive terminal of the 12-volt source. This collector is also connected to a 100 micro-microfarad grounded capacitor 636.

The collector of the transistor 626 is connected to a 100 ohm resistor 638 which, in turn, is connected to the negative terminal of the 12-volt direct voltage source. This latter collector is also connected to a 100 micro-microfarad grounded capacitor 640.

The emitter of the transistor 624 is connected through a diode 642 to a variable inductance coil 644. The emitter of the transistor 626 is connected through a diode 646 to a variable inductance coil 648. Each of the inductance coils 644 and 648 has an inductance of from 1.8–3.6 microhenries.

The inductance coil 644 is connected to a 1.2 kilo-ohm resistor 650, and the inductance coil 648 is connected to a like resistor 652. These resistors are connected to a 3.9 kilo-ohm potentiometer 654, the arm of which is connected to an output terminal 656.

The inductance coils 644 and 648 are also connected to respective 22 micro-microfarad capacitors 658 and 660. These capacitors are connected to respective 16 ohm resistors 662 and 664. These latter resistors are connected to a 20 ohm potentiometer 666, the arm of which is also connected to the output terminal 656. A .02 microfarad grounded capacitor 668 is connected to the output terminal.

The phase-error detector of FIGURE 14 operates in known manner to produce an error signal at the output terminal 656 whenever the phase of the input signals apply to its input terminals 600 and 602 departs from a predetermined relationship. This error signal is applied to a direct current amplifier 60 so as to control the motor 62 as described above.

The invention provides, therefore, an improved system for controlling the drive of a magnetic tape, and the like. The improved system of the invention has been described in conjunction with a particular type of drive which includes a pair of capstans spaced along the tape. The various transducers associated with the tape, not shown, are positioned between the two capstans. The one of the capstans is driven in the opposite sense, so as to act as a dynamic brake, so as to exert a predetermined tension on the tape, as it is drawn past the transducers.

The improved control system of the invention permits a low inertia drive motor to be used, yet assures that the tape will be drawn at a constant speed past the transducer heads. The improved system of the invention also provides for an adequate control to the second capstan, so that any dynamic changes in the speed of the first capstan will not provide elongations of the tape, which, in turn, would produce time displacement errors of the signals recorded thereon, or reproduced therefrom by the transducers positioned between the capstans.

While particular embodiments of the invention have been shown and described, modifications may be made, and it is intended in the claims to cover such modifications which fall within the spirit and scope of the invention.

What is claimed is:

1. A system for controlling the speed of a magnetic tape, including:

a first driving means for said tape to impart movement thereto, said driving means having a speed adjustment control;

a second driving means for said tape spaced apart from said first driving means, said first and second driving means together imparting a tension to said tape, said second driving means having a speed adjustment control;

a transducer means for producing a first electric signal having a phase related to the tape speed;

a source of references pulses of a predetermined phase relationship;

a phase error detector means coupled to said transducer means and to said source of reference pulses for detecting the variation in phase between said first electric signal and said source of reference pulses and for producing a composite signal directly related to said variation; and a coupling means for coupling said phase error detector means to said speed adjustment control on said first and a second driving means whereby the speed of said first driving means and the relative speed of said first and second driving means and therefore said tape tension are adjusted responsive to the signal from said phase error detector means.

2. A system for controlling the speed of a magnetic tape including:

a first driving means for said tape to impart movement thereto, said driving means having a speed adjustment control;

a second driving means for said tape spaced apart from said first driving means, said first and second driving means together imparting a tension to said tape, said second driving means having a speed adjustment control;

a transducer means for producing a first electric signal having a phase related to the tape speed;

a coarse phase error detector means coupled to said transducer means for detecting the variation between the speed as indicated by said first electric signal and a predetermined synchronous speed, and for producing a D.-C. voltage directly related to said variation;

a source of references pulses of a predetermined phase relationship;

a fine phase error detector means coupled to said transducer means to said source of reference pulses and to said coarse phase error detector means for detecting the variation in phase between said first electric signal and said source of reference pulses and for producing a composite signal directly related to said variation and to the D.-C. voltage produced by said coarse phase error detector means; and a coupling means for coupling said fine phase error detector means to said speed adjustment control on said first and second driving means whereby the speed of said first driving means and the relative speed of said first and second driving means and therefore said tape tension are adjusted responsive to the signal from said fine phase error detector means.

3. A system for controlling the speed of a magnetic tape having a track of timing signals recorded thereon, including:

a transducer means magnetically coupled to said tape for producing a first electric signal having a phase related to said timing signals;

a first driving means for said tape to impart relative movement between said tape and said transducer means, said driving means having a speed adjustment control;

a second driving means for said tape spaced apart from said first driving means, said first and second driving means together imparting a tension to said tape, said second driving means having a speed adjustment control;

a coarse phase error detector means coupled to said transducer means for detecting the variation between the speed as indicated by said first electric signal and a predetermined synchronous speed, and for producing a D.-C. voltage directly related to said variation;

a source of references pulses of a predetermined phase relationship;

a fine phase error detector means coupled to said transducer means to said source of reference pulses and to said coarse phase error detector means for detecting the variation in phase between said first electric signal and said source of reference pulses and for producing a composite signal directly related to said variation and to the D.-C. voltage produced by said coarse phase error detector means; and a coupling means for coupling said fine phase error detector means to said speed adjustment control on said first and second driving means whereby the speed of said first driving means and the relative speed of said first and second driving means and therefore said tape tension are adjusted responsive to the signal from said fine phase error detector means.

References Cited by the Examiner
UNITED STATES PATENTS

| | | | |
|---|---|---|---|
| 2,457,792 | 12/1948 | Wild et al. | 318—20 |
| 2,458,731 | 1/1949 | Rath | 318—20 |
| 2,845,586 | 7/1958 | Stringer | 318—6 |
| 2,864,988 | 12/1958 | Kline et al. | 318—163 X |
| 2,877,397 | 3/1959 | Poschner et al. | 318—16 |
| 2,905,876 | 9/1959 | Hillman | 318—327 |
| 2,911,580 | 11/1959 | Gould et al. | 318—327 |
| 2,913,652 | 11/1959 | Greenberg et al. | 318—314 X |
| 2,995,693 | 8/1961 | Johnson | 318—314 |
| 3,008,075 | 11/1961 | Scott | 318—314 |
| 3,059,163 | 10/1962 | Kinney et al. | 318—314 |
| 3,086,157 | 5/1963 | Branco | 318—314 |
| 3,097,332 | 7/1963 | Mullen | 318—7 |
| 3,119,055 | 1/1964 | Martin | 318—314 X |
| 3,174,090 | 3/1965 | Hall | 318—314 |
| 3,175,159 | 3/1965 | Hall | 318—314 X |
| 3,176,208 | 3/1965 | Gifft | 318—314 |
| 3,187,092 | 6/1965 | Shashoua et al. | 318—314 X |
| 3,207,970 | 9/1965 | Branco | 318—314 |

ORIS L. RADER, *Primary Examiner.*

T. LYNCH, *Assistant Examiner.*